United States Patent
Yuasa et al.

(10) Patent No.: US 6,642,345 B2
(45) Date of Patent: Nov. 4, 2003

(54) NOVOLAK ARALKYL RESIN, PREPARATION PROCESS THEREOF AND COMPOSITION CONTAINING SAID RESIN

(75) Inventors: Teruo Yuasa, Aichi (JP); Hiroaki Narisawa, Aichi (JP); Masahiro Kaneko, Aichi (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/032,476

(22) Filed: Jan. 2, 2002

(65) Prior Publication Data

US 2002/0128423 A1 Sep. 12, 2002

(30) Foreign Application Priority Data

Jan. 9, 2001 (JP) .......................................... 2001-001095
Aug. 3, 2001 (JP) .......................................... 2001-236617

(51) Int. Cl.⁷ .......................... C08G 14/04; C08G 8/10; C08G 61/02
(52) U.S. Cl. ........................ 528/129; 528/137; 528/140; 528/144; 528/154; 528/230; 528/486; 528/488; 528/495; 528/503
(58) Field of Search ................................. 528/129, 137, 528/140, 144, 154, 230, 486, 488, 495, 503

(56) References Cited

U.S. PATENT DOCUMENTS 3,787,350 A    1/1974   Harris et al.
4,318,821 A    3/1982   Harris et al.

FOREIGN PATENT DOCUMENTS

| EP | 0 363 539 A1 | 4/1990 |
| EP | 0 519 376 A2 | 12/1992 |
| EP | 0 664 319 A2 | 7/1995 |
| JP | 4-142324 | 5/1992 |
| JP | 4-173834 | 6/1992 |
| JP | 5-310893 | 11/1993 |

*Primary Examiner*—Duc Truong
(74) *Attorney, Agent, or Firm*—Burns, Doane, Swecker & Mathis, LLP

(57) ABSTRACT

Preparation process for a novolak aralkyl resin having excellent heat resistance and curing property by reacting 0.4 to 0.8 mol of an aralkyl compound based on one mol of the low molecular weight novolak containing 90% by weight or more of bi-nuclear novolak in the presence of an acidic catalyst, the process comprising at first melting the low molecular weight novolak, heating it up to a reaction temperature, then adding 0.001 to 0.05% by weight of the acidic catalyst to the total amount of the low molecular weight novolak and the aralkyl compound, then continuously adding the aralkyl compound for reaction, neutralizing the residual acidic catalyst after the completion of the reaction, a novolak aralkyl resin obtained by the preparation process and a novolak aralkyl resin composition containing said resin.

14 Claims, No Drawings

NOVOLAK ARALKYL RESIN, PREPARATION PROCESS THEREOF AND COMPOSITION CONTAINING SAID RESIN

BACKGROUND OF THE INVENTION

1. Field of the Invention

This invention relates to a novolak aralkyl resin having both structural units of low molecular weight novolak units and aralkyl group units together and a preparation process thereof, and composition containing the resin.

More in particular, it relates to a novolak aralkyl resin which is heightened its molecular weight while increasing the repeating structural units of low molecular weight novolak units and aralkyl group units by suppressing decomposition of low molecular weight novolak, makes its curing reaction with hexamethylenetetramine or the like progress uniformly and rapidly, provides excellent heat resistance to its cured products and suitable to application uses such as friction materials, sliding materials, molding materials and encapsulating materials, a preparation process thereof, a novolak aralkyl resin composition causing rapid curing reaction and providing excellent heat resistance to its cured products which is suitable to friction materials such as disk brake pads, brake linings and clutch facings for braking automobiles, railway vehicles and various industrial machines, to binders for molding materials such as electric and electronic equipment parts, communication equipment parts and mechanical parts and to sliding materials and so on.

In this invention, novolak means, resins having a repeating structure of phenol nuclear units and methylene group units obtained by reacting, for example, phenol and formaldehyde in the presence of an acidic catalyst. They are referred to bi-nuclear novolak, tri-nuclear novolak and the like depending on the number of phenol nuclear units. Further, low molecular weight novolak is a collective term for novolaks up to about penta-nuclear novolak.

2. Related Art Statement

A phenolic resin as a reaction product of a phenol compound and an aralkyl compound such as p-xylylene glycol dimethyl ether is generally referred to as a xylok resin which is a phenol aralkyl resin having a repeating structure of phenol nuclei and aralkyl group as described, for example, in Japanese Patent Publication No. 15111/1972 and Japanese Patent Publication No. 14280/1977. The phenol aralkyl resin has excellent characteristics for heat resistance, soft and flexibility and hygroscopic resistance compared with novolak type phenol resin and has been generally used for applications such as friction materials, molding materials and encapsulating materials. However, in the field where it is used by being cured with hexamethylenetetramine or the like, since the ratio of the phenol nuclei is small in the resin, the curing reaction is slow for which improvement has been desired.

For compensating the drawback, Japanese Patent Laid-Open No. 142324/1992 proposes a modified phenol aralkyl resin obtained by reacting phenols, an aralkyl compound and formaldehyde in the presence of an acidic catalyst at 100 to 150° C. Further, Japanese Patent Laid-Open No. 173834/1992 discloses a phenolic resin of using phenol and novolak resin together, which is reacted with p-xylylene glycol dimethyl ether. However, since phenol is used as the raw material in the both resins described above, they contain a phenol aralkyl resin portion causing slow curing reaction, their curing rate are insufficient. In addition, though a novolak resin portion is present during reaction in the method described in both of the publications, when the novolak resin has high molecular weight, it further is heightened molecular weight remarkably or gelled in the subsequent reaction, so that the amount of the aralkyl compound to be introduced can not be increased and, as a result, the amount of unreacted novolak resin increases to bring about a problem of lowering the heat resistance. Further, since the amount of the acidic catalyst used is large, it involves a problem that the catalyst remaining in the resin causes decomposing reaction, failing to obtain a resin of stable property.

In addition, there can be mentioned a method of increasing the velocity of curing reaction by mixing a novolak type phenol resin with the phenol aralkyl resin, but since the novolak type phenol resin reacts preferentially to hexamine or the like, this results in a problem of unevenness in the curing.

When novolak, particularly, a low molecular weight novolak and an acidic catalyst are brought into contact, it causes decomposition and re-bonding to form phenol and high molecular weight novolak. Accordingly, decomposition and re-bonding reaction are also caused in a case of reacting the low molecular weight novolak with the aralkyl compound in the presence of the acidic catalyst, so that it leads to a problem that a stable reaction product containing many repeating structural units of low molecular weight novolak and aralkyl groups can not be obtained.

DISCLOSURE OF THE INVENTION

This invention intends to provide a novolak aralkyl resin having both structures of bi-nuclear novolak units and aralkyl group units together and being capable of conducting the curing reaction with hexamethylenetetramine or the like rapidly and uniformly while maintaining the excellent heat resistance inherent to the phenol aralkyl resin, and a preparation process thereof, and a composition containing the novolak aralkyl resin described above.

An aimed novolak aralkyl resin can be obtained by increasing the repeating structural units of bi-nuclear novolak units and aralkyl group units and by increasing the molecular weight of the resin. In this case, it is important to suppress the decomposing reaction of the low molecular weight novolak. Novolak causes decomposition and re-bonding by being heated in the presence of an acidic substance to form phenol and high molecular weight novolak. For example, when a bi-nuclear novolak as a typical example of the low molecular weight novolak is heated for about one hour in the presence of the same acidic catalyst and at the same temperature as upon reaction with the aralkyl compound, about 8 mol % phenol is formed, and twice molar amount of bi-nuclear novolak is lost and tri-or higher poly-nuclear novolak is formed. On the other hand, when the reaction velocity with the aralkyl compounds is compared between the low molecular weight novolak and phenol, the reaction velocity is higher for the low molecular weight novolak. For example, when the mixture of bi-nuclear novolak and phenol containing each at an equal molar amount is reacted with the aralkyl compound, it results in more unreacted component for phenol.

Accordingly, even if the bi-nuclear novolak and the aralkyl compound are charged each by a predetermined amount for reaction into the reaction system, when the decomposition of the bi-nuclear novolak proceeds, reaction is taken place for three ingredients of novolak, phenol and aralkyl compound and the properties of the resultant resin is deviated from desired values depending on the extent of the decomposition. Further, after the completion of the reaction, in a case where the decomposition proceeds while liberating a phenol, the resultant resin becomes instable because of bonding of disconnected active residues with other molecules of bi-nuclear novolak or the like. Consequently, the molecular weight of the resultant resin becomes higher.

From the foregoings, as a means for obtaining a resin containing many repeating structural units of low molecular weight novolak and aralkyl groups, it is important to suppress the decomposing reaction of the low molecular weight novolak and to avoid the formation of the free phenol as an index of the decomposition of raw materials such as low molecular weight novolak as less as possible.

The present inventors have made an earnest study on the basis of the knowledge as described above, as a result, have found that the decomposition of the low molecular weight novolak during the reaction can be suppressed to obtain an aimed resin upon reacting low molecular weight novolak containing a bi-nuclear novolak at a specified amount or more and an aralkyl compound in the presence of an acidic catalyst by suppressing contact of the acidic catalyst only with the low molecular weight novolak as the raw material, restricting the amount of the catalyst to a required minimum level as less as possible and, further, neutralizing the acidic catalyst after the completion of the reaction, and have accomplished this invention.

That is, the first feature of this invention resides in a preparation process for a novolak aralkyl resin by reacting 0.4 to 0.8 mol of an aralkyl compound based on one mol of a low molecular weight novolak containing 90% by weight or more of a bi-nuclear novolak in presence of an acidic catalyst, wherein comprising at first melting the low molecular weight novolak and heating it up to a reaction temperature, then adding 0.001 to 0.05% by weight of the acidic catalyst based on the total amount of the low molecular weight novolak and the aralkyl compound, then continuously adding the aralkyl compound for reaction, neutralizing the residual acidic catalyst after the completion of the reaction.

As a preferred embodiment for the preparation process for the novolak aralkyl resin described above, there can be mentioned a method of using p-xylylene glycol dimethyl ether as an aralkyl compound, a method of practicing the reaction at a reaction temperature within a range of 130 to 160° C., a method of using hydroxides of calcium, barium, magnesium or a mixture of such metals as a neutralizing agent.

The second feature of this invention resides in a novolak aralkyl resin obtained by the preparation process described above. The resin is a novolak aralkyl resin represented by the general formula (1):

一般式 (1)

wherein m is an integer of 1 to 4 and n is an integer of 1 to 10,000, in which the ratio of the low molecular weight novolak unit with m being 1 based on low molecular weight novolak unit with m being 1 to 4 in the general formula (1) described above is at least 80% by weight, the hydroxyl equivalent is 120 to 145 g/eq, and the content of the free phenol is 2% by weight or less.

The third feature of this invention resides in a novolak aralkyl resin composition containing 80 to 95% by weight of the novolak aralkyl resin described above and 5 to 20% by weight of the hexamethylenetetramine. The resin composition has such characteristics that the 90% curing time at 150° C. is 7 to 12 minutes and the weight retention ratio after storage at 300° C. for 240 hours is 70% or more.

A molding base material or a solvent may be added to the resin composition depending on the application use. When the molding base material is added, 80 to 95% by weight of at least one molding base material selected from the group consisting of reinforcing fibers, lubricants and fillers is added based on 5 to 20% by weight of the resin composition. Further, when the solvent is added, 30 to 70% by weight of an organic solvent is added based on 30 to 70% by weight of the resin composition. A preferred solvent can include methanol, ethanol, methyl ethyl ketone, butyl cellosolve, butyl carbitol or a mixture of them.

The fourth feature of this invention is a novolak aralkyl resin composition containing 10 to 75% by weight of the novolak aralkyl resin described above, 25 to 90% by weight of an epoxy resin and 0.01 to 5% by weight of a curing catalyst based on the total amount of both of the resins.

In a case where the resin composition is used, for example, as a encapsulating material, 100 to 190 parts by weight of an organic filler, inorganic filler or a mixture thereof is added based on 100 parts by weight of the resin composition.

According to this invention, decomposition of the low molecular weight novolak can be suppressed in the entire preparation steps from the charging of the raw materials to the formation of a novolak aralkyl resin, consequently, the novolak aralkyl resin with a high ratio of BPF unit based on the low molecular weight novolak unit with m being 1 to 4 in the general formula (1) can be obtained. The novolak aralkyl resin contains many repeating structures of BPF units and aralkyl group units. Since the novolak aralkyl resin according to this invention has the same heat resistance substantially as existent phenol aralkyl resins and conducts the curing reaction with hexamethylenetetramine or the like uniformly and rapidly. Therefore, a resin composition containing the novolak aralkyl resin according to this invention has both excellent heat resistance and moldability. Accordingly, the novolak aralkyl resin and the composition containing the resin of this invention can be used suitably as binders for molding materials such as friction materials for disk brake pads, brake linings and clutch facings used for braking automobiles, railway vehicles and various industrial machine, electric and electronic equipment parts, commu-

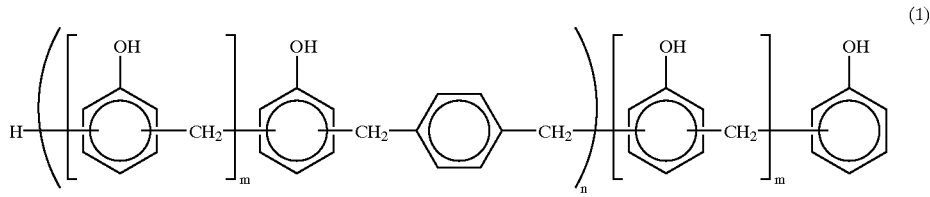

(1)

nication equipment parts and machine parts, sliding materials, semiconductor encapsulating materials, lamination materials, coatings and adhesives.

The ratio of the low molecular weight novolak unit with m being 1 based on the low molecular weight novolak unit with m being 1 to 4 in the general formula (1) described above in the novolak aralkyl resin according to this invention means a value determined by a method shown in the example to be described later. In this invention, the low molecular weight novolak unit with m being 1 in the general formula (1) means a bi-nuclear novolak unit.

PREFERRED EMBODIMENTS OF THE INVENTION

This invention is to be described in details. At first, a preparation process for a novolak aralkyl resin according to the first feature of this invention is to be described. The outline of the preparation process for the novolak aralkyl resin according to this invention is as follows. The preparation process, which comprises reacting a low molecular weight novolak containing a specified amount or more of a bi-nuclear novolak (hereinafter simply referred to as BPF) with an aralkyl compound in the presence of a relatively small amount of an acidic catalyst and neutralizing the residual catalyst after the completion of the reaction.

Usually, the low molecular weight novolak includes a novolak resin with 65% by weight or more of BPF content obtained by reacting about 6 to 30 moles of phenol with 1 mole of formaldehyde in the presence of an acidic catalyst and then removing unreacted phenol (hereinafter simply referred to as de-phenol product), and a novolak resin with 90% by weight or more of BPF obtained by distillation from the de-phenol product, and a novolak resin with non-distilled tri-nuclear novolak as the main ingredient. The amount of BPF in the low molecular weight novolak gives an effect on the heat resistance of the resultant resin. When the amount of BPF is smaller, the ratio of the BPF unit in the resultant novolak aralkyl resin is lowered and the repeating structure of the BPF units and the aralkyl units is decreased. That is, since the novolak resin portion is increased, the heat resistance of the resultant resin is lowered. Further, it is preferred to use the low molecular weight novolak having stable composition such as the BPF content as the raw material for producing a novolak aralkyl resin having stable qualities. With a view point described above, it is preferred in this invention to use a low molecular weight novolak with the BPF content of 90% by weight or more in the low molecular weight novolak described above.

The aralkyl compound used in this invention, can include, for example, α, α'-dichloro-p-xylene, α, α'-dichloro-o-xylene, α, α'-dichloro-m-xylene, p-xylylene glycol, p-xylylene glycol dimethyl ether (hereinafter simply referred to as PXDM), α, α'-dimethoxy-o-xylene, α, α'-dimethoxy-m-xylene, and α, α'-dimethoxy-p-xylene. A preferred aralkyl compound is PXDM.

As PXDM, a high purity product of 98% by weight or more is preferred. A PXDM obtained industrially usually contains impurities such as α-methoxy-p-xylene, α, α-dimethoxy-p-xylene, α, α, α'-trimethoxy-p-xylene, p-xylylene glycol and p-xylylene glycol monomethyl ether. However, there is no problem when the amount of the impurities is less than 2% by weight.

The amount of the low molecular weight novolak and the aralkyl compound used gives an effect on the curing reaction with hexamethylenetetramine (hereinafter simply referred to as hexamine) or the like and the heat resistance of the resultant resin. For obtaining a resin having excellent heat resistance and curing reactivity, it is preferred to use 0.4 to 0.8 mole of the aralkyl compound based on one mole of the low molecular weight novolak. A further preferred amount of the aralkyl compound is 0.5 to 0.75 mole. When the amount of the aralkyl compound used exceeds 0.8 mole, high molecular weight novolak alalkyl resin increases remarkably or gelation of the resin occurs. Consequently, the aimed resin can not be obtained. On the contrary, when it is less than 0.4 mole, since unreacted low molecular weight novolak increases, the molecular weight of the resin is not increased and the heat resistance of the resin is lowered.

The low molecular weight novolak and the aralkyl compound are reacted in the presence of an acidic catalyst. As Preferable acidic catalyst, for example, zinc chloride, stannic chloride, sodium hydrogen sulfate, sulfuric acid, hydrochloric acid, oxalic acid, monoethyl sulfuric acid, diethyl sulfate, phenol sulfonic acid and p-toluene sulfonic acid are illustrated. Diethyl sulfate is more Preferable. For suppressing the decomposition reaction of the low molecular weight novolak and completing the condensation reaction rapidly, the amount of the acidic catalyst used is preferable within a range from 0.001 to 0.05% by weight based on the total amount of the low molecular weight novolak and the aralkyl compound as using the raw materials. A further preferred range is from 0.005 to 0.02% by weight. When the amount exceeds 0.05% by weight, decomposition of the low molecular weight novolak increases. On the contrary, when the amount is less than 0.001% by weight, the reaction velocity is lowered.

In the presence of the acidic catalyst, change of the properties occurs in the resultant resin even after the aralkyl compound has been consumed thoroughly to complete the reaction. Specifically, unreacted low molecular weight novolak and the novolak resin portion of the resultant resin are decomposed while liberating phenol and re-bonded with them to become high molecular weight resin. Accordingly, for stabilizing the properties of the resin, it is important to conduct neutralization of the residual acidic catalyst after the completion of the reaction.

There is no particular restriction on the neutralizing agent so long as it is basic, hydroxides of alkali metals such as lithium, sodium and potassium or alkaline earth metals such as magnesium, calcium or barium are preferred. Hydroxide of magnesium, calcium or barium is further preferred. Barium hydroxide which gives less effect on the properties of the resin and which neutralization salt to be formed is used as a filler for friction materials is further preferred.

The amount of the neutralizing agent used is preferably from 0.8 to 1.1 equivalent based on the acidic catalyst while depending on the amount of the acidic catalyst used. 1.0 equivalent is most preferred. When it is less than 0.8 equivalent, non-neutralizing acidic catalyst undesirably causes change of the properties of the resin. On the other hand, when it exceeds 1.1 equivalent, the resin is undesirably tinted yellow.

When PXDM is used as the aralkyl compound, it is also useful to use a small amount of methanol upon practicing this process. Though the reaction of the low molecular weight novolak with PXDM by-produces methanol, elevation of the reaction temperature at the initial stage of the reaction can be prevented by previously adding the small amount of methanol prior to the start of the reaction. That is, though heat is generated upon starting of the reaction and the internal temperature rises till the by-produced methanol is saturated in the reaction system, the internal temperature elevation can be prevented by previously adding the saturation amount of methanol, which leads to the effect of preventing decomposition of the low molecular weight novolak. The amount of methanol to be added is preferably 2 to 4% by weight based on the low molecular weight novolak, for example, in a case where the reaction temperature is 130 to 160° C.

In addition to the ingredients described above, addition of commercial defoamer silicone is also useful. Particularly, in a case of producing a high molecular weight resin, it can provide an effect of easily withdrawing by-produced methanol from the reaction system to prevent rise of the liquid surface of the reaction product and further shorten the time of operation such as removal of methanol conducted under a reduced pressure. A preferred addition amount of the silicone is 10 to 20 ppm based on the resin formed.

A preferred embodiment of the preparation process according to this invention is as described below. After charging a low molecular weight novolak and a small amount of methanol into a reactor and elevating the temperature up to reaction temperature, an acidic catalyst is added. Then, continuous charging of PXDM is initiated. Charging of PXDM is continued while distilling off the by-produced methanol and, when charging of a predetermined amount of the PXDM is completed, aging reaction is conducted to complete the reaction. Then, the catalyst is neutralized and a trace amount of methanol and water dissolved therein are removed under a reduced pressure.

The reaction temperature is preferable within a range from 120 to 200° C. A more preferred range is from 130 to 160° C. When it is lower than 120° C., the reaction velocity is extremely slow. On the other hand, when it exceeds 200° C., decomposition of the low molecular weight novolak used as raw materials and the reaction product increases. Further, in a case of using PXDM as the aralkyl compound, a portion of PXDM is extracted together with by-produced methanol out of the reaction system.

Even though the low molecular weight novolak with a high BPF content is used as raw material, when the decomposition of the low molecular weight novolak during reaction increases, the ratio of the BPF unit in the resultant novolak aralkyl resin is lowered, and it results in decreasing of the repeating structure of the BPF units and the aralkyl units. That is, since the novolak resin portion increases, the heat resistance of the resultant novolak aralkyl resin is lowered. Accordingly, it is necessary to react by a method of suppressing the decomposition of the low molecular weight novolak.

The decomposition of the low molecular weight novolak takes place most remarkably in the step from the instance the catalyst is added to the start of the charging of the aralkyl compound. Therefore, it leads to the prevention of decomposition to shorten the time of contact only between the low molecular weight novolak and the catalyst. Accordingly, it is preferred to start the charging of the aralkyl compound immediately after addition of the catalyst. Further, for obtaining a resin having stable characteristics, it is preferred to shorten the time of contact only between the low molecular weight novolak and the catalyst as less as possible. The shorter contact time is more preferred for reducing the deviation in the characteristics of the resin, it is preferably less than 30 minutes, particular preferably, less than 15 minutes. If necessary, a portion of the aralkyl compound to be charged may be present in the reaction system before addition of the catalyst.

The method of suppressing the decomposition of the low molecular weight novolak can include a method of charging the whole raw materials at the same time and a method of adding the catalyst continuously. Specifically, the former is a method of charging the low molecular weight novolak, the aralkyl compound and the catalyst at the same time, then initiating the reaction, while the latter is a method of charging the low molecular weight novolak and the aralkyl compound at the same time, then continuously adding the catalyst such as hydrochloric acid to conduct reaction. Each of the methods can suppress the decomposition of the low molecular weight novolak and suppress the formation of phenol. However, they involve such problems that the control for the reaction velocity or the molecular weight is difficult, the reactor efficiency is poor, high molecular weight compound insoluble to the solvent is formed on the reactor wall and a great amount of catalyst is required.

As a result of considering them, the present inventors have reached a preparation process of this invention of at first charging the low molecular weight novolak, elevating the temperature up to the reaction temperature, adding the acidic catalyst and then instantly starting the continuous charging of the aralkyl compound.

The continuous charging time of the aralkyl compound depends on the molar ratio of the raw materials, the reaction temperature and the scale of the reaction. It is usually from 30 minutes to 10 hours at the preferred reaction temperature described above. It is preferably, 1 to 6 hours. When it is less than 30 minutes, unreacted aralkyl compound increases to require a long time for the aging reaction substantially. On the contrary, if it exceeds 10 hours, decomposition of the low molecular weight novolak increases and the productivity is lowered.

The aging reaction is conducted till the completion of the reaction. Completion of the reaction means that the unreacted aralkyl compound is no more present in the reaction system. Though the aging time required differs depending on the amount of the catalyst, the reaction temperature and the charging time of the aralkyl compound, it is about 30 minutes to 5 hours. For example, it requires about three hours in a case where PXDM is used for the aralkyl compound, the catalyst is used by 0.01% by weight based on the total amount of the low molecular weight novolak and the PXDM, the reaction temperature is set at 145° C. and PXDM is charged for three hours for reaction.

Since decomposition proceeds also even after the completion of the reaction by the contact of the reaction product and the unreacted low molecular weight novolak with the acidic catalyst, to give an effect on the properties of the resultant resin, it is important to instantly neutralize the residual catalyst after the completion of the aging reaction. Particularly, since the pressure reduction step and the discharging operation are conducted at a high temperature for a long time, neutralization of the residual catalyst gives a significant effect for the stabilization of the properties of the resin. The neutralizing agent may be added either in the form a solid as it is or in the form of a solution. Since the amount of it to be used is small amount, it is effective to conduct neutralization in the form of an aqueous solution for rapid neutralization. Since the reaction liquid after the neutralization contains a small amount of methanol and water containing neutralization agent dissolved therein, they are distilled off under a reduced pressure.

In the preparation process according to this invention, since a method of charging the low molecular weight novolak, elevating the temperature up to the reaction temperature, adding a specified amount of the acidic catalyst and then continuously charging the aralkyl compound is adopted, therefore, the decomposition reaction of the low molecular weight novolak and the reaction product that occurs from the charging of the raw material to the completion of the condensation reaction can be suppressed. Accordingly, the novolak aralkyl resin obtained by the preparation process according to this invention contains 2% by weight or less of free phenol formed mainly by the decomposition of the low molecular weight novolak. The free phenol optionally can be reduced further by being removed strictly under a reduced pressure. The content of the free phenol is most preferably 0% by weight. The content of the free phenol of 2% by weight or less formed by the decomposition of the low molecular weight novolak means that the decomposition amount of the low molecular weight novolak is 5 mol % or less. When the decomposition is kept at such an extent or less, a resin having desired properties can be obtained by using the low molecular weight novolak and the aralkyl compound at a predetermined ratio.

In the preparation process for the novolak aralkyl resin according to this invention, since the low molecular weight novolak as the raw material is used in excess relative to the aralkyl compound and since the reaction is conducted while suppressing the decomposition of the low molecular weight novolak till the aralkyl compound is no more present in the reaction system, the resultant resin contains 8 to 20% by weight of BPF. Accordingly, the resin with the BPF content of less than 8% by weight with no particular operation for removing BPF shows that this is a resin suffering from remarkable decomposition of the low molecular weight novolak.

The unreacted BPF can also be decreased optionally, for example, by a method of distillation, hot water extraction or steam stripping under the conditions at a temperature of 200 to 250° C. and at a pressure of 0.1 to 6.7 kPa. The resin removed with the unreacted BPF has a feature of having only the repeating structure of the low molecular weight novolak units and the aralkyl group units. Further, unreacted BPF can be decomposed and reduced also by continuing heating without neutralization even after the completion of the condensation reaction, but the properties of the resultant resin are remarkably changed undesirably.

The second feature of this invention resides in the novolak aralkyl resin obtained by the preparation process described previously. According to the preparation process for the resin, the decomposition reaction of the low molecular weight novolak and the reaction product that occurs during reaction of the low molecular weight novolak with the aralkyl compound is suppressed. Accordingly, in the novolak aralkyl resin according to the second feature of this invention, the ratio of the low molecular weight novolak with m being 1 based on a low molecular weight novolak unit with m being 1 to 4 in the general formula (1) described above is at least 80% by weight. The novolak aralkyl resin having such a structure is excellent in the heat resistance and has high curing reaction velocity.

The novolak aralkyl resin according to the second feature of this invention produced as described above has a hydroxyl equivalent of 120 to 145 g/eq. It is preferably from 130 to 140 g/eq. When it is less than 120 g/eq, the resin is of low molecular weight with less aralkyl group ratio and many unreacted low molecular weight novolak is contained and heat resistance is low. When it exceeds 145 g/eq, the resin has an extremely high molecular weight and the molding becomes difficult.

The hydroxyl equivalent can be forecast approximately based on the ratio of the low molecular weight novolak and the aralkyl compound used. Even though the decomposition occurs remarkably and much phenol is formed, it is possible to obtain a resin of the preferred range described above unless the phenol is removed out of the reaction system. Further, the resin having similar hydroxyl group equivalent can be obtained also by a method of mixing the phenol aralkyl resin and the novolak resin, a method of using phenol and novolak together to react them with PXDM as described in Japanese Published Unexamined Patent Laid-open No. 173834/1992. However, even though the hydroxyl equivalent is adjusted within the range as specified in this invention by these methods described above, the resin represented by the general formula (1) according to this invention can not be obtained and the curing reaction with hexamine or the like proceeds not uniformly.

According to the preparation process of this invention, decomposition of the low molecular weight novolak during the condensation reaction is suppressed. Accordingly, it is possible to obtain a novolak aralkyl resin having less content of the free phenol as the index of the decomposition, having a high ratio of the BPF unit based on the low molecular weight novolak units with m being 1 to 4 in the general formula (1) described above and containing many repeating structures of the BPF units and the aralkyl group units. Since the novolak aralkyl resin according to this invention conducts curing reaction with hexamine or the like uniformly and rapidly, it is possible to obtain a resin composition suitable to friction materials by mixing with hexamine and molding materials such as reinforcing fiber, lubricant or filler. Further, since the acidic catalyst has been neutralized, a stable modified resin is obtained also in a case of modifying with a silicone rubber. Further, when it is used as a curing agent of an epoxy resin, since the hydroxyl equivalent is small, it provides a merit capable of decreasing the amount to be used.

Then, description is to be made to a novolak aralkyl resin composition according to the third feature of this invention. The novolak aralkyl resin composition according to this invention is produced by adding and mixing a specified amount of hexamine to the novolak aralkyl resin described above. There is no particular restriction on the mixing method and it can include, for example, a method of pulverizing and finely powderizing while mixing by using a pulverizer or the like. The mixing temperature is preferably near the room temperature.

The blending ratio of the hexamine with the novolak aralkyl resin gives an effect, for example, on the curing velocity, curing degree, heat resistance of curing product and the operation circumstance. When the addition amount of the hexamine is insufficient, the curing velocity of the resin is slow, no sufficient curing degree is obtained and it is difficult to obtain a cured product having excellent heat resistance. On the contrary, if the addition amount is excessive, excess hexamine is decomposed to evolve a great amount of ammonia, which is not preferred in view of the operation circumstance. Considering them, it is preferred to mix 80 to 95% by weight of the novolak aralkyl resin and 5 to 20% by weight of hexamine. Further preferably, it is within a range from 87 to 93% by weight of the novolak aralkyl resin and from 7 to 13% by weight of hexamine.

The novolak aralkyl resin composition according to the third feature of this invention requires a short time to reach 90% curing ratio of 7 to 12 minutes when cured at 150° C. and the curing velocity is extremely high compared with existent phenol aralkyl resins. Further, the molding product obtained by curing the resin composition at 150° C. has a weight retention ratio of 70% or more after storage at 300° C. for 240 hours and shows excellent heat resistance much more than the novolak resin and shows the same heat resistance as the phenol aralkyl resin. Accordingly, the novolak aralkyl resin composition according to this invention is a novel resin composition having the excellent heat resistance and high speed molding property together.

When the resin composition according to the third feature of this invention is used, for example, to a friction material, it is preferred to add molding base materials such as reinforcing fibers, lubricants and fillers to the resin composition containing the novolak aralkyl resin and the hexamine as described above. In this case, they are mixed within a range of 5 to 20% by weight of the resin composition containing the novolak aralkyl resin and the hexamine and 80 to 95% by weight of at least one molding base material selected from the group consisting of reinforcing fibers, lubricants and fillers.

The reinforcing fiber in this invention can include inorganic, organic and metal fibers such as glass fibers, carbon fibers, alamide fibers and steel fibers. The lubricant can include, graphite, antimony sulfide and molybdenum sulfide. Further, the filler can include, for example, cashew dust, barium sulfate, calcium carbonate, magnesium carbonate, silica and metal powder. The molding base material may be used singly, or two or more of them may be used as a mixture.

When the resin composition according to this invention is used, for example, to wet friction materials, adhesives or sliding materials, it is preferred to add a solvent to the resin composition containing the resin and the hexamine. In this case, 30 to 70% by weight of the resin composition containing the novolak aralkyl resin and hexamine and 30 to 70% by weight of the solvent are mixed to dissolve the resin composition. A preferred solvent can include at least one solvent selected from the group consisting of methanol, ethanol, methyl ethyl ketone, butyl cellosolve and butyl carbitol.

Then, description is to be made to a novolak aralkyl resin composition according to the fourth feature of this invention. The novolak aralkyl resin composition according to this invention is also prepared by mixing the novolak aralkyl resin described above, an epoxy resin and a curing catalyst. There is no particular restriction on the mixing method and, for example, a method of dissolving each of them in a solvent or a pulverization mixing method. The mixing temperature is preferably near the room temperature. A cured product is obtained by applying a heat treatment to the novolak aralkyl resin composition according to this invention within a temperature range usually from 100 to 250° C.

The epoxy resin may be any epoxy resin so long as two or more epoxy groups are contained in one molecule and it can include, for example, bisphenol-A type epoxy resin, bisphenol-F type epoxy resin, phenol novolak type epoxy resin, cresol novolak type epoxy resin, glycidyl ether type epoxy resin such as tetramethyl biphenyl type epoxy resin, cycloaliphatic epoxy resin such as (3', 4'-epoxy cyclohexyl methyl)-3-4-epoxy cyclohexane carboxylate. Two or more of the epoxy resins may be used together. Typical commercial products of the cresol novolak type epoxy resin can include, for example, EOCN-102S; trade name of product manufactured by Nippon Kayaku Co.

The blending ratio of the epoxy resin to the novolak aralkyl resin gives an effect on the curing velocity, the curing degree, and the heat resistance and hygroscopic resistance of the curing product. When the blending amount of the novolak aralkyl resin is insufficient, the curing velocity of the resin composition is slow, no sufficient curing degree is obtained and it is difficult to obtain a cured product having excellent heat resistance and hygroscopic resistance. Further, when the blending ratio is excessive, the performances described above can not be provided at a good balance, which is also not preferred. In view of the above, it is preferred to mix the novolak aralkyl resin from 10 to 75% by weight and the epoxy resin from 25 to 90% by weight being expressed by weight percentage. Further preferably, the novolak aralkyl resin ranges from 15 to 70% by weight and the epoxy resin ranges from 30 to 85% by weight. Further, the equivalent ratio of the hydroxyl groups in the novolak aralkyl resin and the epoxy groups in the epoxy resin is from 0.5 to 1.5 molar equivalent amount and, preferably, from 0.7 to 1.3 molar equivalent amount of the hydroxyl groups based on 1 molar equivalent amount of the epoxy group and it is preferred to adjust the molar ratio so as to obtain the optimal properties of the curing product.

The curing catalyst can include, for example, organic phosphine compounds such as triphenyl phosphine, imidazole compounds such as 2-ethyl-4-methylimidazole and bi-cyclic nitrogen containing compounds such as 1,8-diazabicyclo (5,4,0) undeca-7-ene. The addition amount of the curing catalyst is 0.01 to 5% by weight, preferably, 0.05 to 1% by weight based on the total weight of the novolak aralkyl resin and the epoxy resin.

An organic filler, an inorganic filler, a mixture thereof or other additives may optionally added to the novolak aralkyl resin composition according to the fourth feature of this invention. It is particularly preferred to use the organic filler, inorganic filler or the mixture thereof for improving the mechanical properties or for reducing the entire cost, a colorant such as carbon black for preventing erroneous operation by light and, further, a mold release agent, a coupling agent, a flame retardant such as antimony trioxide and a flexibilizer such as acrylonitrile, butadiene rubber and silicone oil.

The organic filler, inorganic filler or the mixture thereof to be used can include, for example, powder such as silica, alumina, silicon nitride, silicon carbide, talc, calcium silicate, calcium carbonate, mica, clay and titanium white, and fibers such as glass fibers, carbon fibers and alamide fibers.

The amount of the organic filler, the inorganic filler or the mixture thereof to be used is from 100 to 1900 parts by weight based on 100 parts by weight of the novolak aralkyl resin composition. In view of the hygroscopic resistance and the mechanical strength, it is preferably from 250 to 1900 parts by weight and, more preferably, from 550 to 1900 parts by weight. The novolak aralkyl resin composition according to the fourth feature of this invention can provide a cured product having excellent heat resistance and hygroscopic resistance. Accordingly, it is used suitably, for example, to semiconductor encapsulating materials, lamination materials, coatings, adhesives and molding materials.

EXAMPLES

This invention is to be described more specifically with reference to examples. In the examples, "%" means "% by weight". Further, the results of various analyses show the values measured by the following methods.

(1) Ratio of BPF Unit Based on Low Molecular Weight Novolak Unit with m Being 1 to 4 in the General Formula (1) Described Above in Novolak Aralkyl Resin [wt. %]

In this invention, the ratio C of BPF unit (m=1) based on the low molecular weight novolak unit (m=1–4) in the novolak aralkyl resin is defined as the ratio of the weight of reacted BPF (ratio reacted as BPF without decomposition) based on the weight of the reacted low molecular weight novolak represented by percentage, which is determined by the following equations (1)–(7):

$$C=100 \cdot (W_1/W_2) \quad (1)$$

where $W_1$: weight of reacted BPF (g), $W_2$: weight of reacted low molecular weight novolak (g).

$W_1$ in the equation (1) is represented by the following equation (2):

$$W_1 = \alpha \cdot W_3 - W_4 - W_5 \quad (2)$$

where $\alpha$: weight percentage of BPF in low molecular weight novolak (measured value), $W_3$: weight of low molecular weight novolak used (g) (charged value), $W_4$: weight of BPF consumed by decomposition (g), $W_5$: weight of unreacted BPF (g) (measured value).

$W_4$ in the equation (2) is represented by the following equation (3):

$$W_4 = (\beta \cdot W_6/M_1) \cdot 2 \cdot M_2 \quad (3)$$

where $\beta$: weight percentage of free phenol in the reaction liquid upon completion of aging reaction (measured value), $W_6$: amount of reaction liquid (g) upon completion of aging reaction, $M_1$: molecular weight of phenol (assumed as 94.11), $M_2$: molecular weight of BPF (assumed as 200).

$$W_6 = W_7 = W_8 \quad (4)$$

since $W_7$: total charged amount (g) (charged value), $W_8$: total amount of distillation liquid from reaction system (g) (measured value), the value for the $W_1$ can be determined based on the equations (2)–(4).

On the other hand, $W_2$ in the equation (1) is represented by the following equation (5):

$$W_2 = W_3 - \beta \cdot W_6 - W_9 \quad (5)$$

where $W_9$: weight of unreacted low molecular weight novolak (g).

Since most of the unreacted low molecular weight novolak is BPF, $$W_9 = W_5 \quad (6)$$

equation (5) is represented by equation (7) and the value for $W_2$ can be obtained:

$$W_2 = W_3 - \beta \cdot W_6 - W_5 \quad (7)$$

(2) Content of Free Phenol in the Novolak Aralkyl Resin and the Reaction Liquid (%)

Analysis is conducted by using a gas chromatograph [model: GC-9A, manufactured by Shimadzu Seisakusho Co.], through columns (inside diameter; 3 mm, length; 2 m) filled with SILICONE OV-1 9.09 wt. % of on CHROMOSOLVE W AW DMCS, using nitrogen as a carrier gas while elevating a temperature from 100° C. to 240° C. at a rate of 10° C./min. The specimen for analysis is prepared by acetylation with pyridine and acetic acid anhydride. Naphthalene is used as an internal standard substance.

(3) Number of Nuclei of Low Molecular Weight Novolak and Molecular Weight of Novolak Aralkyl Resin A high speed liquid chromatograph manufactured by Nippon Bunko Co. (Model: JASCO GULLIVER SERIES) was used and four serially joined columns manufactured by Showa Denko Co. (Model: KF-804, 803, 802, 802] are used. Tetrahydrofuran is used as an eluent. RI (diffraction meter) was used as a detector. The weight average molecular weight (hereinafter simply referred to as molecular weight or Mw) is indicated as standard polystyrene converted value.

(4) Hydroxyl Equivalent of Novolak Aralkyl Resin (g/eq)

The specimen was accurately weighted by about 1 g in a 200 ml Erlenmeyer flask, dissolved with 22.5 ml of pyridine and 2.5 ml of acetic acid anhydride and, after reacting for 1 hour at 90–100° C., 2 ml of distilled water is added and kept at 100° C. for 30 min. Then, after cooling, it is titrated with 0.5N sodium hydroxide aqueous solution. A blank test with no specimen is conducted simultaneously. The equivalent amount is calculated according to the following equation.

$$OHeq = (1000\,w) / \{0.5\,F(B-A)\}$$

where OHeq: hydroxyl equivalent (g/eq), w: weight of specimen, B: amount of 0.5N sodium hydroxide aqueous solution (ml) required for blank test, A: amount of 0.5N sodium hydroxide aqueous solution (ml) required for specimen, F: titer of 0.5N sodium hydroxide aqueous solution.

(5) Properties of Novolak Aralkyl Resin Composition According to the Third Feature of the Invention (5)-1 Curing Time of Novolak Aralkyl Resin Composition (min)

Curing property was measured at 150° C. and 160° C. for the novolak aralkyl resin compositions obtained in Preparation Examples 1–9 and Comparative Preparation Example 1–5 by using a curust meter (Model VDP, manufactured by Orientech Co.), and the time reaching 90% value for the maximum torque was measured and determined as a curing time.

(5)-2 Weight Retention Ratio (%) at 300° C. of Novolak Aralkyl Resin Composition 4.5 g of a resin composition obtained each by Preparation Examples 5 and 8 and Comparative Preparation Examples 2, 4 and 5 is filled in a lower metal mold of a curust meter (Model; VDP manufactured by Orientech Co.) heated previously to 150° C. and kept for 2 minutes and 30 seconds till a portion of the resin composition is melted and its volume is to be held in the metal mold. Then an upper metal mold is lowered and usual measurement was conducted for 20 minutes and molding products with no bubbles are prepared each by three on each of the specimens. The molding product is placed in a gear oven and temperature is elevated to 240° C. for 2 hours. Then, after storing for 1 hour, it is gradually cooled to a room temperature for 1.5 hours or more (the heat treatment is referred to as postcure). After measuring the weight of the post cured molding product, it is stored in a gear oven at 300° C. The weight at the instance the preservation time reaches 24, 96, 144, 192 and 240 hours is measured respectively, the weight retention ratio (%) is calculated in accordance with the following equation and shown by an average value.

$$W_{re} = 100 \cdot (W_{11}/W_{10})$$

where $W_{re}$: weight retention ratio (%), $W_{10}$: weight of post cured molding product (g), $W_{11}$: weight of molded product after preserved at 300° C. for a predetermined time (g).

(5)-3 Molding Time of Novolak Aralkyl Resin Composition Containing Molding Base Material (min.)

300 g of specimens each obtained in Preparation Example 10 and Comparative Preparation Example 6 is placed in a metal mold of 95 mm length, 95 mm width and 70 mm depth, which is pressurized to 9.8 MPa between two press plates and preliminarily molded at a room temperature and being out of the metal mold. Successively, the preliminarily molded molding material composition is placed in the metal mold of 100 mm length, 100 mm width and 50 mm depth heated previously to 160° C. by putting between two press plates heated to 160° C., and pressed at 12.75 MPa. Then, pressure molding is conducted for a predetermined period while degassing once on every 15 seconds till lapse of 3 minutes and each once after lapse of 4 minutes and 5 minutes respectively. Instantly, the Rockwell hardness (HRR scale) at the surface of the resultant molding product is measured by the method according to JIS K-6911.

For the evaluation of the molding rate, the pressure molding time (min.) till the hardness reaches the maximum value is measured. Model TD-37 manufactured by Toho International Co. is used as a molding machine, and Model ATK-F200 manufactured by Akashi Seisakusho Co. is used for the Rockwell hardness meter.

(6) Characteristics of Novolak Aralkyl Resin Composition According to Fourth Feature of this Invention (6)-1 Glass Transition Point of Cured Product Obtained from Novolak Aralkyl Resin Composition [Tg] (° C.)

A linear expansion coefficient is measured for the specimens (cured product) obtained in Preparation Example 12 and Comparative Preparation Examples 7 to 8 by using a thermal analyzer (model TMA8146 manufactured by Rigaku Co.) (TMA method) and Tg is determined.

(6)-2 Water Absorptivity of Cured Product Obtained from Novolak Aralkyl Resin Composition (wt. %)

The same specimen as described in the preceding paragraph is immersed in boiling water at 100° C. for 2 hours and the water absorptivity(F: wt. %) is shown by the change of weight before and after immersion. F is calculated according to the following equation.

$$F = [(A-B)/B] \times 100 \text{ (wt. \%)}$$

A: weight of cured product after immersion in water,
B: weight of cured product before immersion in water.

Example 1

<Preparation of Novolak Aralkyl Resin A>

To a 500 ml separable flask equipped with a thermometer, a stirrer and a condenser, 200 g of a low molecular weight novolak (BPF-ST, trade name of product manufactured by Mitsui Chemicals Inc., composition: BPF 99.7%, tri-nuclear novolak 0.3%, molecular weight: 200) and 8 g of methanol were charged and the temperature was elevated in an oil bath while stirring to 145° C. of internal temperature and the low molecular weight novolak was melted. Then, a methanol solution of 0.176 g of diethyl sulfate adjusted to 10% (hereinafter simply referred to as a diethyl sulfate solution) was added. 15 min after, charging of PXDM was started and 123.11 g thereof was continuously charged for three hours while distilling off by-produced methanol to conduct condensating reaction. Further, an aging reaction was conducted for 3.5 hours while keeping the internal temperature at 145° C. Then, an aqueous solution of 0.4744 g of barium hydroxide adjusted to 4% (hereinafter simply referred to as a barium hydroxide solution) was added, temperature was elevated to 165° C. for 45 min while conducting a neutralizing reaction and then methanol was removed under a reduced pressure to obtain 273 g of a novolak aralkyl resin. The resultant novolak aralkyl resin had a molecular weight of 42510, the hydroxyl equivalent of 138 g/eq, the content of the free phenol of 0.19% by weight and the value for the ratio C of BPF unit relative to the low molecular weight novolak unit with m being 1 to 4 in the general formula (1) described above of 98% by weight.

Example 2

<Preparation of Novolak Aralkyl Resin B>

To the same apparatus as in Example 1, 200 g of a low molecular weight novolak (BPF-M, trade name of product manufactured by Mitsui Chemicals Inc., composition: BPF of 91.5%, tri-nuclear novolak of 7.2%, tetra-nuclear novolak of 1.2%, penta-nuclear novolak of 0.1% and molecular weight of 206) and 8 g of methanol were charged, the temperature was elevated in an oil bath to melt the content at 108° C. and then the internal temperature was elevated to 145° C. while stirring. Then, 0.3196 g of a diethyl sulfate solution was added. 15 min after, charging of PXDM was started and 118.71 g thereof was continuously charged for three hours while distilling off by-produced methanol to conduct a condensating reaction. Further, an aging reaction was conducted for 3 hours while keeping the internal temperature at 145° C. Then, 0.8978 g of a barium hydroxide solution was added, temperature was elevated to 165° C. for 45 min while conducting a neutralizing reaction and then methanol was removed under a reduced pressure, to obtain 272 g of a novolak aralkyl resin. The resultant novolak aralkyl resin had a molecular weight of 73280, the hydroxyl equivalent of 137 g/eq, the content of the free phenol of 0.29% by weight and the value C of 87% by weight.

Example 3

<Preparation of Novolak Aralkyl Resin C>

270 g of a novolak aralkyl resin was obtained in the same manner as in Example 2 except for using 0.3152 g of the diethyl sulfate solution, 116.63 g of PXDM and 0.8659 g of the barium hydroxide solution. The resultant novolak aralkyl resin had a molecular weight of 34410, the hydroxyl equivalent of 136 g/eq, the content of free phenol of 0.30% by weight and the value C of 87% by weight.

Example 4

<Preparation of Novolak Aralkyl Resin D>

269 g of a novolak aralkyl resin was obtained in the same manner as in Example 2 except for using 0.3144 g of the diethyl sulfate solution, 114.70 g of PXDM and 0.8587 g of the barium hydroxide solution. The resultant novolak aralkyl resin had a molecular weight of 20160, the hydroxyl equivalent of 135 g/eq, the content of free phenol of 0.33% by weight and the value C of 87% by weight.

Example 5

<Preparation of Novolak Aralkyl Resin E>

336 g of a novolak aralkyl resin was obtained in the same manner as in Example 2 except for using 250 g of BPF-M, 7.5 g of methanol, 0.3894 g of the diethyl sulfate solution, 140.85 g of PXDM and 1.0801 g of the barium hydroxide solution. The resultant novolak aralkyl resin had a molecular weight of 14510, the hydroxyl equivalent of 134 g/eq, the content of free phenol of 0.33% by weight and the value C of 87% by weight.

Example 6

<Preparation of Novolak Aralkyl Resin F>

534 g of a novolak aralkyl resin was obtained in the same manner as in Example 2 except for using a 1000 ml separable flask equipped with a thermometer, a stirrer and a condenser, 400 g of BPF-M, 12 g of methanol, 0.6090 g of the diethyl sulfate solution, 221.60 g of PXDM and 1.6482 g of the barium hydroxide solution. The resultant novolak aralkyl resin had a molecular weight of 11160, the hydroxyl equivalent of 134 g/eq, the content of free phenol of 0.36% by weight and the value C of 87% by weight.

Example 7

<Preparation of Novolak Aralkyl Resin G>

530 g of a novolak aralkyl resin was obtained in the same manner as in Example 2 except for using 400 g of BPF-M, 12.0 g of methanol, 0.615 g of the diethyl sulfate solution, 219.70 g of PXDM and 1.7375 g of the barium hydroxide solution. The resultant novolak aralkyl resin had a molecular weight of 9550, the hydroxyl equivalent of 133 g/eq, the content of free phenol of 0.38% by weight and the value C of 87% by weight.

Example 8

<Preparation of Novolak Aralkyl Resin H>

266 g of a novolak aralkyl resin was obtained in the same manner as in Example 2 except for using 200 g of BPF-M, 6.0 g of methanol, 0.3035 g of the diethyl sulfate solution, 107.23 g of PXDM and 0.8323 g of the barium hydroxide solution. The resultant novolak aralkyl resin had a molecular weight of 7460, the hydroxyl equivalent of 133 g/eq, the content of free phenol of 0.38% by weight and the value C of 87% by weight.

Example 9

<Preparation of Novolak Aralkyl Resin I>

263 g of a novolak aralkyl resin was obtained in the same manner as in Example 2 except for using 200 g of BPF-M, 6.0 g of methanol, 0.3035 g of the diethyl sulfate solution, 103.88 g of PXDM and 0.8341 g of the barium hydroxide solution. The resultant novolak aralkyl resin had a molecular weight of 5780, the hydroxyl equivalent of 132 g/eq, the content of free phenol of 0.29% by weight and the value C of 87% by weight.

Comparative Example 1

<Preparation of Novolak Aralkyl Resin J>

200 g of the same low molecular weight novolak as in Example 2 and 4 g of methanol were charged in the same apparatus as in Example 1, temperature was elevated in an oil bath and, after melting the contents at 110° C., 0.3369 g of a diethyl sulfate solution was added. Then, the internal temperature was elevated to 165° C. for 49 min and charging of PXDM was started. 103.88 g of PXDM was continuously charged for three hours to conduct condensating reaction while distilling off by-produced methanol. Further, an aging reaction was conducted for 1 hour while keeping the internal temperature at 165° C. Successively, 0.9337 g of a barium hydroxide solution was added and, after conducting a neutralizing reaction for 30 min while keeping at the same temperature, methanol and the like were removed under a reduced pressure to obtain 263 g of a novolak aralkyl resin.

The resultant novolak aralkyl resin had the molecular weight of 9530, the hydroxyl equivalent of 132 g/eq, the content of free phenol of 2.14% by weight and the C value of 79% by weight.

Comparative Example 2
<Preparation of Novolak Aralkyl Resin K>

262 g of a novolak aralkyl resin was obtained in the same manner as in Example 9 except for using 2.46 g of a diethyl sulfate solution, conducting the aging reaction for 1.5 hours and using 6.71 g of a barium hydroxide solution. The resultant novolak aralkyl resin had the molecular weight of 11370, the hydroxyl equivalent of 132 g/eq, the content of free phenol of 2.35% by weight and C value of 77% by weight.

Comparative Example 3
<Preparation of Novolak Aralkyl Resin L>

The steps up to the completion of the aging reaction were conducted in the same manner as in Example 9 except for using 0.3077 g of a diethyl sulfate solution and changing the time from the addition of the diethyl sulfate solution to the start of the charging of PXDM to 35 min. Then, it was elevated to a temperature of 165° C. and kept for 4 hours without neutralization, to obtain 264 g of a novolak aralkyl resin. The resultant novolak aralkyl resin had the molecular weight of 9470, the hydroxyl equivalent of 132 g/eq, the content of free phenol of 2.10% by weight and the C value of 79% by weight.

Reaction conditions in Examples 1 to 9 and Comparative Examples 1 to 3, as well as the obtained results are shown in Table 1 to Table 3.

TABLE 1

|  |  | Example 1 | Example 2 | Example 3 | Example 4 | Example 5 |
|---|---|---|---|---|---|---|
| Low molecular weight novolak | (g) | 200(ST) | 200(M) | 200(M) | 200(M) | 250 |
| " | (mol) | 1.00 | 0.971 | 0.971 | 0.971 | 1.214 |
| Methanol | (g) | 8 | 8 | 8 | 8 | 7.5 |
| Diethyl sulfate catalyst | (m mol) | 0.1143 | 0.2075 | 0.2047 | 0.2042 | 0.2529 |
| PXDM | (g) | 123.11 | 118.71 | 116.63 | 114.70 | 140.85 |
| " | (mol) | 0.741 | 0.714 | 0.702 | 0.690 | 0.848 |
| Catalyst addition - charge start | (min) | 15 | 15 | 15 | 15 | 15 |
| Charge time/reaction temp | (Hr)/(° C.) | 3/145 | 3/145 | 3/145 | 3/145 | 3/145 |
| Aging reaction | (Hr)/(° C.) | 3.5/145 | 3/145 | 3/145 | 3/145 | 3/145 |
| Ba(OH)$_2$ | (m mol) | 0.1108 | 0.2096 | 0.2022 | 0.2005 | 0.2522 |
| Distillation liquid in reaction | (g) | 48.2 | 44.6 | 44.9 | 43.6 | 53.5 |
| Free phenol in the reaction liquid | (%) | 0.29 | 0.57 | 0.57 | 0.54 | 0.63 |
| Reaction product yield | (g) | 273 | 272 | 270 | 269 | 336 |
| Molecular weight | Mw | 42510 | 73280 | 34410 | 20160 | 14510 |
| Free phenol in the resin | (%) | 0.19 | 0.29 | 0.30 | 0.33 | 0.33 |
| Hydroxyl equivalent | (g/eq) | 138 | 137 | 136 | 135 | 134 |
| Unreacted BPF in the resin | (%) | 8.8 | 8.2 | 8.6 | 9.0 | 9.6 |
| Softening point | (° C.) | — | 117 | 111.5 | 107.5 | 106.5 |
| C value | (wt %) | 98 | 87 | 87 | 87 | 87 |
| Resin name |  | A | B | C | D | E |
| Resin composition name in preparation example |  | AA | BB | CC | DD | EE |
| Molding material resin composition name in preparation example |  |  |  |  |  |  |

TABLE 2

|  |  | Example 6 | Example 7 | Example 8 | Example 9 |
|---|---|---|---|---|---|
| Low molecular weight novolak | (g) | 400(M) | 400(M) | 200(M) | 200(M) |
| Low molecular weight novolak | (mol) | 1.942 | 1.942 | 0.971 | 0.971 |
| Methanol | (g) | 12 | 12 | 6 | 6 |
| Diethyl sulfate catalyst | (m mol) | 0.4013 | 0.3994 | 0.1971 | 0.1971 |
| PXDM | (g) | 221.60 | 219.70 | 107.23 | 103.88 |
| PXDM | (mol) | 1.333 | 1.322 | 0.645 | 0.625 |
| Catalyst addition - charge start | (mm) | 15 | 15 | 15 | 15 |
| Charge time/reaction temp | (Hr)/(° C.) | 3/145 | 3/145 | 3/145 | 3/145 |
| Aging reaction | (Hr)/(° C.) | 3/145 | 3/145 | 3/145 | 3/145 |
| Ba(OH)$_2$ | (m mol) | 0.3848 | 0.4056 | 0.1943 | 0.1947 |
| Distillation liquid in reaction | (g) | 85.4 | 82.8 | 40.6 | 39.4 |
| Free phenol in the reaction liquid | (%) | 0.61 | 0.54 | 0.62 | 0.65 |
| Reaction product yield | (g) | 534 | 530 | 266 | 263 |
| Molecular weight | Mw | 11160 | 9550 | 7460 | 5780 |
| Free phenol in the resin | (%) | 0.36 | 0.38 | 0.38 | 0.29 |
| Hydroxyl equivalent | (g/eq) | 134 | 133 | 133 | 132 |
| Unreacted BPF in the resin | (%) | 9.6 | 9.9 | 10.4 | 11.1 |
| Softening point | (° C.) | 104.5 | 103.5 | 100.5 | 97.5 |
| C value | (wt %) | 87 | 87 | 87 | 87 |
| Resin name |  | F | G | H | I |
| Resin composition name in preparation example |  | FF | GG | HH | II |
| Molding material resin composition name in preparation example |  | FFF |  |  |  |

TABLE 3

| | | Comp.Exam 1 | Comp.Exam 2 | Comp.Exam 3 | | |
|---|---|---|---|---|---|---|
| Low molecular weight novolak | (g) | 200(M) | 200(M) | 200(M) | Commercial phenol aralkyl resin XL-225 | Commercial novolak type phenol resin #2000 |
| " | (mol) | 0.971 | 0.971 | 0.971 | | |
| Methanol | (g) | 4 | 6 | 6 | | |
| Diethyl sulfate catalyst | (m mol) | 0.2188 | 1.597 | 0.1998 | | |
| PXDM | (g) | 103.88 | 103.88 | 103.88 | | |
| " | (mol) | 0.625 | 0.625 | 0.625 | | |
| Catalyst addition - charge start | (min) | 49 | 15 | 35 | | |
| Charge time/reaction temp | (Hr)/(° C.) | 3/165 | 3/145 | 3/145 | | |
| Aging reaction | (Hr)/(° C.) | 1/165 | 1.5/145 | 3/145 | | |
| Ba(OH)$_2$ | (m mol) | 0.2180 | 1.567 | 0 | | |
| Distillation liquid in reaction | (g) | 40.15 | 41.75 | 40.0 | | |
| Free phenol in the reaction liquid | (%) | 2.25 | 2.71 | 2.15 | | |
| Reaction product yield | (g) | 263 | 262 | 264 | — | — |
| Molecular weight | Mw | 9530 | 11370 | 9470 | 11970 | 2850 |
| Free phenol in the resin | (%) | 2.14 | 2.35 | 2.10 | 3.7 | 3.1 |
| Hydroxyl equivalent | (g/eq) | 132 | 132 | 132 | 185 | 106 |
| Unreacted BPF in the resin | (%) | 7.7 | 7.0 | 8.2 | — | 9.8 |
| Softening point | (° C.) | 98.5 | 99.0 | 98.0 | 93 | 96 |
| C value | (wt %) | 79 | 77 | 79 | 0 | 0 |
| Resin name | | J | K | L | M | N |
| Resin composition name in preparation example | | JJ | KK | LL | MM | NN |
| Molding material resin composition name in preparation example | | | | | MMM | |

Preparation Examples 1 to 9 and Comparative Preparation Examples 1 to 5
<Preparation of Novolak Aralkyl Resin Composition According to Third Feature of this Invention>

Novolak aralkyl resin compositions AA-LL, and MM and NN were produced by adding 12 parts by weight of hexamine to 100 parts by weight of each of novolak aralkyl resins A-I obtained in Examples 1 to 9, and novolak aralkyl resins J-L obtained in Comparative Examples 1 to 3, as well as commercial phenol aralkyl resin (XL-225: trade name of product manufactured by Mitsui Chemicals Inc., free phenol content of 3.7% by weight, hydroxyl equivalent of 185 g/eq, molecular weight of 11970, C value of 0% by weight) M and commercial novolak type phenol resin (novolak #2000: trade name of product manufactured by Mitsui Chemicals Inc., phenol content of 3.1% by weight, hydroxyl equivalent of 106 g/eq, molecular weight of 2850, C value of 0% by weight) N, and finely powdered while mixing in a pulverizer.

(1) Measurement for Curing Time

The curing time was measured by the method described above for the novolak aralkyl resin compositions AA-II (Preparation Examples 1 to 9), novolak aralkyl resin compositions JJ-LL (Comparative Preparation Examples 1 to 3), resin compositions MM and NN obtained from the commercial phenol aralkyl resin and the novolak type phenol resin (Comparative Preparation Examples 4 to 5). The result obtained are shown in Table 4.

TABLE 4

| | Measuring result for curing time | | | | |
|---|---|---|---|---|---|
| Preparation Example (resin composition name) | Curing time (min) | | Comparative preparation example (resin composition name) | Curing time (min) | |
| | 150° C. | 160° C. | | 150° C. | 160° C. |
| Preparation Example 1 (AA) | 10.9 | | Comparative preparation example 1 (JJ) | 10.1 | |
| Preparation Example 2 (BB) | 10.9 | | Comparative preparation example 2 (KK) | 10.3 | |
| Preparation Example 3 (CC) | 10.6 | | Comparative preparation example 3 (LL) | 10.1 | |
| Preparation Example 4 (DD) | 10.1 | | Comparative preparation example 4 (MM) | 20.6 | 16.5 |
| Preparation Example 5 (EE) | 10.0 | | Comparative preparation example 5 (NN) | 5.4 | |
| Preparation Example 6 (FF) | 10.1 | 6.2 | | | |
| Preparation Example 7 (GG) | 9.9 | | | | |
| Preparation Example 8 (HH) | 9.8 | | | | |
| Preparation Example 9 (II) | 9.6 | | | | |

(2) Measurement for Heat Resistance

Weight retention ratio at 300° C. was measured by the method described above for evaluating the heat resistance of the novolak aralkyl resin compositions EE and HH obtained in Preparation Examples 5 and 8, as well as resin compositions KK, MM and NN obtained in the Comparative Preparation Examples 2, 4 and 5. The results obtained are Table 5.

TABLE 5

Measuring result for heat resistance

| Preparation Example and Comparative Preparation Example | (resin composition name) | Weight retention ratio at 300° C. (%) | | | | |
|---|---|---|---|---|---|---|
| | | 24 hrs | 96 hrs | 144 hrs | 192 hrs | 240 hrs |
| Preparation Example 5 | (EE) | 97.8 | 94.2 | 91.5 | 85.8 | 82.5 |
| Preparation Example 8 | (HH) | 97.6 | 94.0 | 90.5 | 82.7 | 78.2 |
| Comparative Preparation Example 2 | (KK) | 97.2 | 91.1 | 84.7 | 72.3 | 65.9 |
| Comparative Preparation Example 4 | (MM) | 98.2 | 95.0 | 92.7 | 88.3 | 85.3 |
| Comparative Preparation Example 5 | (NN) | 95.5 | 83.5 | 68.8 | 52.0 | 39.5 |

Preparation Example 10

<Preparation of Novolak Aralkyl Resin Composition According to the Third Feature of this Invention Containing the Molding Base Material>

15% by weight of the novolak aralkyl resin composition FF, 5% by weight of Kevler fibers [Dry pulp 979 (2 mm): trade name of product manufactured by Dupont•Toray•Kevler Co.], 10% by weight of glass fibers [Chopped strand (3 mm): trade name of product manufactured by Nippon Denki Glass Co.], 10% by weight of graphite [#2: trade name of product manufactured by Nippon Graphite Industry Co.], 10% by weight of cashew dust (SENLITE) [FF-1081: trade name of product manufactured by Tohoku Kako Co.] and 50% by weight of calcium carbonate (NS-200: trade name of product manufactured by Nitto Funka Kogyo Co.] were mixed in a Henschel mixer to obtain a novolak aralkyl resin composition FFF containing a molding base material. The molding time for the resin composition FFF containing the molding base material was measured by the method described above. The results obtained are shown in Table 6.

Comparative Preparation Example 6

<Preparation of Phenol Aralkyl Resin Composition Corresponding to the Third Feature of this Invention Containing the Molding Base Material>

A phenol aralkyl resin composition MMM containing the molding base material was obtained in the same manner as in Preparation Example 10 for the novolak aralkyl resin composition except for using the phenol aralkyl resin composition FF instead of the novolak aralkyl resin composition FF. The molding time of the resin composition MMM containing the molding base material was measured by the method described above. The results obtained are shown in Table 6.

TABLE 6

Measuring result for molding rate

| Resin composition name | Preparation Example 10 | Comparative Preparation Example 6 |
|---|---|---|
| Molding material resin composition name | FF | MM |
| | FFF | MMM |
| Pressure molding time (min) | Rockwell hardness (HRR) | Rockwell hardness (HRR) |
| 5 | −0.2 | |
| 10 | 35.9 | −22.9 |
| 15 | 51.8 | |
| 20 | 63.8 | 33.5 |
| 25 | 62.2 | 39.8 |
| 30 | | 53.4 |
| 35 | | 59.2 |
| 40 | | 64.0 |
| 50 | | 64.0 |

Preparation Example 11

<Preparation of Novolak Aralkyl Resin Composition According to the Third Feature of this Invention Containing Solvent>

To a 500 ml rounded bottom separable flask equipped with a thermometer, a stirrer and a condenser, were charged of the novolak aralkyl resin (D) obtained in Example 4, 60 g of butyl cellosolve and 60 g of butyl carbitol, heated to 60 to 70° C., stirred and dissolved. Then, after cooling them to a room temperature, 19.3 g of pulverized hexamine was added and dissolved while being kept at 30° C. or lower. Successively, the solution was transferred to a pressure filter equipped with a stainless steel net of 106 μm openings and filtered under pressure with nitrogen to obtain a yellow brown, transparent, viscous novolak aralkyl resin composition containing the solvent. The specific gravity (25° C./4° C.) was 1.09.

Preparation Example 12 and Comparative Preparation Examples 7 to 8

<Preparation of Novolak Aralkyl Resin Composition According to the Fourth Feature of this Invention and Cured Product Thereof>

As the curing agent, the novolak aralkyl resin H obtained in Example 8 was used in Preparation Example 12, the commercial phenol aralkyl resin (XL-225L: trade name of product manufactured by Mitsui Chemicals Inc., free phenol content of 0.5% by weight, hydroxyl group equivalent of 178 g/eq, molecular weight of 3980 of C value of 0% by weight) was used in Comparative Preparation Example 7, and commercial novolak type phenol resin (novolak #2000: trade name of product manufactured by Mitsui Chemicals Inc., phenol content of 3.1% by weight, hydroxyl group content of 106 g/eq, molecular weight of 2850 and C value of 0% by weight) was used in Comparative Preparation Example 8, respectively. They were pulverized and mixed with the epoxy resin and the curing catalyst to prepare resin compositions.

EOCN-102S: trade name of product manufactured by Nippon Kayaku Co. was used as the epoxy resin and triphenyl phosphine (TPP) was used as the curing catalyst. The blending ratio of the epoxy resin, the curing agent and the curing catalyst was 49 parts by weight of the curing agent and 1 part by weight of the curing catalyst based on 100 parts by weight of the epoxy resin. The obtained resin compositions were cured in a molding die at 175° C. for 5 hours to produce a plate of about 2 mm thickness as the curing products. The properties of the obtained cured products were measured by the method described above and the results are shown in Table 7.

TABLE 7

Heat resistance and hygroscopic resistance

|  | Preparation Example 12 | Comparative Preparation Example 7 | Comparative Preparation Example 8 |
|---|---|---|---|
| Curing agent | Novolak aralkyl resin H | Phenol aralkyl resin | Novolak-type Phenol resin |
| Glass transition point of cured product [Tg] (° C.) | 163 | 142 | 155 |
| Water absorptivity of cured product (%) | 0.44 | 0.44 | 0.52 |

<Brief Explanation for the Tables>

Tables 1 to 3 show the preparation process for the novolak aralkyl resins shown in the examples and the comparative examples, the ratio of reacted BPF to the reacted low molecular weight novolak (C), the hydroxyl equivalent, the free phenol concentration and the like. The hydroxyl equivalent and the like of the commercial phenol aralkyl resin and the novolak type phenol resin are also described in Table 3 for comparison. Table 4 shows the results of measurement for 90% curing time of the compositions with hexamine of the novolak aralkyl resin, the phenol aralkyl resin and the novolak type phenol resin shown in the Preparation examples and the comparative preparation examples. Table 5 shows the results for the measurement of the heat resistance of preparation Examples 5 and 8 and Comparative preparation Examples 2, 4 and 5, that is, the compositions with hexamine of the novolak aralkyl resin, the phenol aralkyl resin and the novolak type phenol resin. Table 6 shows the molding velocity of the molding material resin compositions of preparation Example 10 and Comparative preparation Example 6, that is, the compositions of the novolak aralkyl resin and the phenol aralkyl resin. Table 7 shows the heat resistance and the hygroscopic resistance of the resin cured products using each of the novolak aralkyl resin, the phenol aralkyl resin and the novolak type phenol resin as the curing agent for epoxy resin.

Comparative Example 1 of melting the low molecular weight novolak and elevating the temperature to the reaction temperature after adding the acidic catalyst is out of the range of this invention in view of the Preparation process and a great amount of free phenol is formed by decomposition of BPF and the C value of the resultant resin is low, which is out of the scope of this invention. In the same manner, also Comparative Example 2 out of the scope of this invention in view of the Preparation process with the large addition amount of the acidic catalyst forms many free phenol due to the decomposition of BPF and the C value of the resultant resin is low, which is out of the range of this invention. This resin composition blended with hexamine is deteriorated in the heat resistance. Further, also Comparative Example 3, in which the time from the addition of the acidic catalyst to the charging of the aralkyl compound is long and neutralization is not conducted, forms many free phenol due to the decomposition of BPF and showing lower C value of the resultant resin, which is also out of the scope of this invention.

On the contrary, in the preparation process according to this invention, free phenol due to the decomposition of BPF is formed a little and the molecular weight can be controlled while keeping the C value of the resultant novolak aralkyl resin higher as it is. Further, in the novolak aralkyl resin composition blended with hexamine according to the third feature of this invention, the curing time is greatly shortened compared with that of the phenol aralkyl resin composition, the heat resistance is much more excellent over the novolak type phenol resins composition and reaches a level approximately to that of the phenol aralkyl resin composition. Further, the rapid curing of the novolak aralkyl resin composition according to the third feature of this invention reflects also on the molding rate of the novolak aralkyl resin composition containing the molding base material. Further, the novolak aralkyl resin composition according to the fourth feature containing the novolak aralkyl resin of this invention as a curing agent provides a cured product having heat resistance and hygroscopic resistance more excellent over the resin composition containing phenol aralkyl resin or novolak type phenol resin as the curing agent.

What is claimed is:

1. A preparation process for a novolak aralkyl resin by reacting 0.4 to 0.8 mol of an aralkyl compound based on one mol of a low molecular weight novolak containing 90% by weight or more of a bi-nuclear novolak in the presence of an acidic catalyst, wherein comprising at first melting the low molecular weight novolak and heating it up to a reaction temperature, then adding 0.001 to 0.05% by weight of the acidic catalyst based on the total amount of the low molecular weight novolak and the aralkyl compound, then continuously adding the aralkyl compound for reaction, neutralizing the residual acidic catalyst after the completion of the reaction.

2. A preparation process for a novolak aralkyl resin according to claim 1, wherein the aralkyl compound is p-xylylene glycol dimethyl ether.

3. A preparation process for a novolak aralkyl resin according to claim 1, wherein the reaction temperature is from 130 to 160° C.

4. A preparation process for a novolak aralkyl resin according to claim 1, wherein the neutralizing agent is hydroxide of at least one metal selected from the group consisting of calcium, barium and magnesium.

5. A novolak aralkyl resin obtained by the preparation process as defined in claims 1.

6. A novolak aralkyl resin according to claim 5, wherein the novolak aralkyl resin is represented by the general formula (1):

[Formula 1]

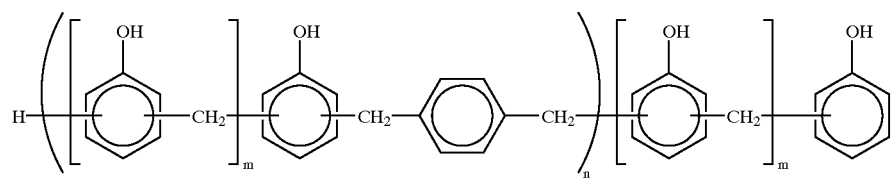

(1)

wherein m is an integer of 1 to 4 and n is an integer of 1 to 10,000, in which the ratio of the low molecular weight novolak unit with m being 1 based on low molecular weight novolak unit with m being 1 to 4 in the general formula (1) described above is at least 80% by weight, the hydroxyl equivalent is 120 to 145 g/eq, and the content of the free phenol is 2% by weight or less.

7. A novolak aralkyl resin composition containing 80 to 95% by weight of the novolak aralkyl resin as defined in claim 5 and 5 to 20% by weight of hexamethylenetetramine.

8. A novolak aralkyl resin composition according to claim 7, wherein the 90% curing time at 150° C. is 7 to 12 minutes and a weight retention ratio after storage at 300° C. for 240 hours is 70% or more.

9. A novolak aralkyl resin composition containing 5 to 20% by weight of the resin composition as defined in claim 7 and 80 to 95% by weight of at least one molding base material selected from the group consisting of reinforcing fibers, lubricants and fillers.

10. A novolak aralkyl resin composition containing 30 to 70% by weight of the resin composition as defined in claim 7 and 30 to 70% by weight of at least one solvent selected from the group consisting of methanol, ethanol, methyl ethyl ketone, butyl cellosolve and butyl carbitol.

11. A novolak aralkyl resin composition containing 10 to 75% by weight of the novolak aralkyl resin as defined in claim 5, 25 to 90% by weight of an epoxy resin and 0.01 to 5% by weight of a curing catalyst based on the total amount of both of the resins.

12. A novolak aralkyl resin composition containing 100 to 1900 parts by weight of at least one filler selected from the group consisting of organic fillers and inorganic fillers based on 100 parts by weight of the novolak aralkyl resin composition as defined in claim 11.

13. A novolak aralkyl resin cured product obtained by heat curing the novolak aralkyl resin composition as defined in claim 11.

14. A novolak aralkyl resin cured product obtained by heat curing the novolak aralkyl resin composition as defined in claim 12.

* * * * *